(12) United States Patent
Weinmann et al.

(10) Patent No.: US 11,898,484 B2
(45) Date of Patent: Feb. 13, 2024

(54) MIXING SUBASSEMBLY FOR AN EXHAUST GAS SYSTEM OF AN INTERNAL COMBUSTION ENGINE

(71) Applicant: Purem GmbH, Neunkirchen (DE)

(72) Inventors: Philipp Weinmann, Esslingen (DE); Vincent Eder, Kirchheim unter Teck (DE); Mathias Rothfuss, Waiblingen (DE); Tobias Wolf, Köngen (DE); Michael Dentler, Reichenbach (DE); Alexander Kauderer, Kuchen (DE)

(73) Assignee: Purem GmbH, Neunkirchen (DE)

( * ) Notice: Subject to any disclaimer, the term of this patent is extended or adjusted under 35 U.S.C. 154(b) by 0 days.

(21) Appl. No.: 18/164,237

(22) Filed: Feb. 3, 2023

(65) Prior Publication Data

US 2023/0250746 A1 Aug. 10, 2023

(30) Foreign Application Priority Data

Feb. 4, 2022 (DE) ...................... 10 2022 102 631.0

(51) Int. Cl.
*F01N 3/28* (2006.01)
*F01N 3/20* (2006.01)

(52) U.S. Cl.
CPC ......... *F01N 3/2892* (2013.01); *F01N 3/2066* (2013.01); *F01N 2450/22* (2013.01); *F01N 2610/1453* (2013.01)

(58) Field of Classification Search
CPC .. F01N 3/2892; F01N 3/2066; F01N 2450/22; F01N 2610/1453; F01N 3/10; F01N 3/28; B01F 23/20
USPC ........................................................ 60/324
See application file for complete search history.

(56) References Cited

U.S. PATENT DOCUMENTS

| 2016/0061078 | A1 | 3/2016 | Schmidt et al. | |
| 2021/0025309 | A1* | 1/2021 | Holz | F01N 3/2053 |
| 2021/0308635 | A1* | 10/2021 | Mayer | F01N 3/021 |

FOREIGN PATENT DOCUMENTS

| DE | 10 2004 020 138 A1 | 11/2005 | |
| DE | 10 2014 112 651 A1 | 3/2016 | |
| DE | 10 2018 204 903 A1 | 10/2019 | |
| DE | 10 2020 109 022 A1 | 10/2021 | |
| EP | 2 732 869 A1 | 5/2014 | |
| WO | 2012/052690 A1 | 4/2012 | |
| WO | WO-2019163598 A1 * | 8/2019 | |

* cited by examiner

*Primary Examiner* — Kenneth J Hansen
*Assistant Examiner* — Kelsey L Stanek
(74) *Attorney, Agent, or Firm* — Walter Ottesen, P.A.

(57) ABSTRACT

A mixing subassembly for an exhaust gas system of an internal combustion engine for mixing exhaust gas, which is discharged by an internal combustion engine, with reactant includes a mixing path which extends in the direction of a mixing path longitudinal axis and which has an upstream mixing path inflow region for receiving exhaust gas and/or reactant in the mixing path. The mixing path includes a core flow channel, through which a first exhaust gas partial flow flows, and a bypass flow channel, through which a second exhaust gas partial flow flows. At least one flow blocking element reduces a flow cross section of the bypass flow channel and is arranged in the bypass flow channel.

12 Claims, 2 Drawing Sheets

MIXING SUBASSEMBLY FOR AN EXHAUST GAS SYSTEM OF AN INTERNAL COMBUSTION ENGINE

CROSS-REFERENCE TO RELATED APPLICATIONS

This application claims priority of German patent application no. 10 2022 102 631.0, filed Feb. 4, 2022, the entire content of which is incorporated herein by reference.

TECHNICAL FIELD

The present disclosure relates to a mixing subassembly for an exhaust gas system of an internal combustion engine for mixing exhaust gas which is discharged by the internal combustion engine with reactant.

BACKGROUND

US 2021/0308635 discloses a mixing subassembly for an exhaust gas system of an internal combustion engine wherein a core flow channel is substantially concentrically surrounded by a bypass flow channel which provides a covering flow channel. A reactant discharge arrangement includes an injector and a mixer which follows the injector and which widens radially. A portion of a first partial exhaust gas flow introduced into the core flow channel is introduced into the internal volume of the mixer and flows together with the reactant which is also injected into this internal volume into the core flow channel so that substantially no reactant reaches the second partial exhaust gas flow which is introduced into the covering flow channel. The core flow channel and the covering flow channel have, in the direction of a mixing path longitudinal axis, that is, a direction in which substantially exhaust gas flows in a respective flow channel, a substantially constant flow cross section.

SUMMARY

An object of the present disclosure is to provide a mixing subassembly for an exhaust gas system for an internal combustion engine which allows simple adaptation to different installation environments with a structurally simple configuration.

This object is achieved according to the disclosure, for example, by a mixing subassembly for an exhaust gas system of an internal combustion engine for mixing exhaust gas which is discharged by an internal combustion engine with reactant, including a mixing path which extends in the direction of a mixing path longitudinal axis and which has an upstream mixing path inflow region for receiving exhaust gas and/or reactant in the mixing path, wherein the mixing path includes a core flow channel, through which a first exhaust gas partial flow flows, and a bypass flow channel, through which a second exhaust gas partial flow flows. At least one flow blocking element which reduces a flow cross section of the bypass flow channel is arranged in the bypass flow channel.

By providing at least one flow blocking element in the bypass flow channel, it is possible to influence the flow resistance and therefore also the mass flow of the exhaust gas which flows through the bypass flow channel without a structural modification of components which define the different flow channels thereby being necessary. The division of the entire exhaust gas flow over the two exhaust gas partial flows can thereby also be influenced simply by selecting the shaping or dimensioning of such a flow blocking element in a manner adapted to an exhaust gas system or an internal combustion engine, in which such a mixing subassembly is used. Consequently, the counter-pressure of the entire exhaust gas system can be optimally adapted to the environment for use and optimum mixing of exhaust gas and reactant can be achieved in the mixing path or upstream of an exhaust gas treatment unit, such as, for example, an SCR catalyst.

In order to be able to achieve an efficient thermal screening of the covering flow channel via the bypass flow channel, it is proposed that the bypass flow channel include a covering flow channel which annularly surrounds the core flow channel and that at least one flow blocking element include a flow blocking ring which is arranged in the covering flow channel.

A substantially uniform blocking in the covering flow channel over the entire circumference thereof can be achieved, for example, in that the flow blocking ring completely surrounds the mixing path longitudinal axis and consequently forms, for example, a closed ring.

The mixing path may include an external mixing path housing which delimits the covering flow channel in a radially outward manner and an internal mixing path housing which delimits the core flow channel in a radially outward manner and which separates it from the covering flow channel. In this case, at least one flow blocking element can be secured to an inner side, which faces the covering flow channel, of the external mixing path housing so that, between the flow blocking element and an outer side, which faces the covering flow channel, of the internal mixing path housing, there is formed a throughflow region with a flow cross section which is reduced with respect to a flow cross section of the covering flow channel upstream of the at least one flow blocking element and with respect to a flow cross section of the covering flow channel downstream of the at least one flow blocking element. Alternatively or additionally, at least one flow blocking element can be secured to the outer side, which faces the covering flow channel, of the internal mixing path housing so that between the flow blocking element and the inner side, which faces the covering flow channel, of the external mixing path housing, there is formed a throughflow region with a flow cross section which is reduced with respect to the flow cross section of the covering flow channel upstream of the at least one flow blocking element and with respect to the flow cross section of the covering flow channel downstream of the at least one flow blocking element.

For stable connection of such a flow blocking ring, the ring may have an annular member with an L-shaped cross sectional profile, wherein a first L-shaped leg of the annular member is secured to the inner side of the external mixing path housing and a second L-shaped leg which extends away from the first L-shaped leg protrudes radially into the covering flow channel and delimits the throughflow region with the internal mixing path housing, or wherein the first L-shaped leg of the annular member is secured to the outer side of the internal mixing path housing and the second L-shaped leg which extends away from the first L-shaped leg protrudes radially into the covering flow channel and delimits the throughflow region with the external mixing path housing.

A securing action, which withstands mechanical, thermal and chemical influences, of a flow blocking ring on a mixing path housing can be achieved, for example, in that the annular member is secured with the first L-shaped leg thereof to the external mixing path housing or the internal mixing path housing by a non-positive-locking connection and/or materially engaging connection, preferably welding.

In order to further influence the flow resistance, at least two flow blocking elements can be secured alternately to the internal mixing path housing and the external mixing path housing in a successive manner in the direction of the mixing path longitudinal axis.

In order to achieve a meandering flow path in this case, at least one flow blocking element which is secured to the internal mixing path housing and at least one flow blocking element which is secured to the external mixing path housing can overlap each other radially.

In order to achieve an exhaust gas flow which is as uniform as possible in the bypass flow channel, it is proposed that at least one flow blocking element be arranged in the region of the mixing path inflow region.

In order to discharge reactant into the mixing path, a reactant discharge arrangement may be provided.

In this case, for improved mixing of exhaust gas and reactant, the reactant discharge arrangement may include a mixer which can be constructed, for example, so as to expand radially in the direction of a reactant main discharge direction.

In order to prevent the production of reactant deposits in the region of the bypass flow channel, it is proposed that a reactant discharge arrangement be constructed in order to discharge reactant substantially only into the first exhaust gas partial flow.

The disclosure further relates to an exhaust gas system including a mixing path which is constructed according to the principles of the present disclosure.

BRIEF DESCRIPTION OF DRAWINGS

The invention will now be described with reference to the drawings wherein.

DETAILED DESCRIPTION

Figure 1:
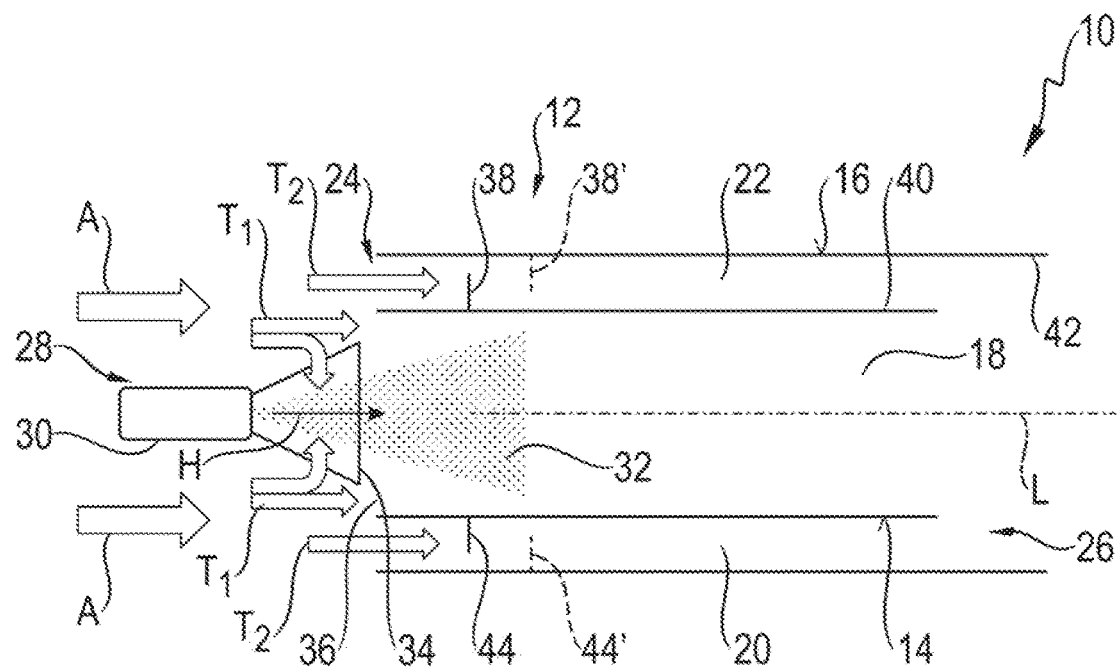
FIG. 1 shows a schematic illustration of a mixing subassembly for an exhaust gas system of an internal combustion engine.

In FIG. 1, there is designated a mixing path 12 which provides a portion of an exhaust gas system which is generally designated 10 for an internal combustion engine, for example, in a vehicle. The mixing path 12 includes a substantially cylindrical, internal mixing path housing 14 which is configured, for example, in a tubular manner and which is elongate in the direction of a mixing path longitudinal axis L. With respect to the mixing path longitudinal axis L, the internal mixing path housing 14 is surrounded radially externally by an external mixing path housing 16 which is also configured, for example, in a tubular or cylindrical manner. The internal mixing path housing 14 delimits a core flow channel 18 of the mixing path 12 radially outwardly. A covering flow channel 22, which substantially concentrically surrounds the core flow path 18 in the embodiment illustrated and which provides a bypass flow channel 20 is delimited by the internal mixing path housing 14 in a radially inward manner and the external mixing path housing 16 in a radially outward manner.

The exhaust gas flow A which is discharged by an internal combustion engine flows in an upstream mixing path inflow region 24 toward the mixing path 12 or the core flow channel 18 and the covering flow path 22. A portion of the exhaust gas flow A is introduced as the first exhaust gas partial flow $T_1$ into the core flow channel 18 and flows substantially in the direction of the mixing path longitudinal axis L along the internal mixing path housing 14 through the core flow channel 18. The remaining portion of the exhaust gas flow A is introduced as the second exhaust gas partial flow $T_2$ into the covering flow channel 22 and flows along the internal mixing path housing 14 or the external mixing path housing 16 along the covering flow channel 22. In a downstream mixing path outflow region 26, the two exhaust gas partial flows $T_1$ and $T_2$ can be combined again and can flow in the direction toward an exhaust gas treatment unit which is arranged downstream of the mixing path, for example, an SCR catalyst or the like.

The mixing path 12 further includes a reactant discharge arrangement which is generally designated 28. The reactant discharge arrangement 28 includes an injector 30 which discharges a reactant which is supplied thereto in liquid form, for example, a urea/water solution, in the form of an atomizing cone 32 in a reactant main discharge direction H which is orientated substantially in the direction of the mixing path longitudinal axis L. There is arranged downstream of the injector 30 a mixer 34 which can be configured, for example, with a wall which is constructed in a frustoconical manner and which expands radially in the reactant main discharge direction H and which consequently delimits a mixing volume, in which, on the one hand, the reactant which is discharged by the injector 30 in the form of the atomized spray 32 is introduced and in which a portion of the first exhaust gas partial flow $T_1$ is also introduced through openings which are formed in the wall of the mixer 34. This portion of the first exhaust gas partial flow $T_1$ flows together with the reactant which is discharged by the injector 30 into the core flow channel 18. The remaining portion of the first exhaust gas partial flow $T_1$ flows along the outer side of the mixer 34 through a gap-like intermediate space 36, which is formed between the mixer 34 and the internal mixing path housing 14, into the core flow channel 18.

It can be seen that, in this arrangement of the reactant discharge arrangement 28, the reactant which is discharged by the injector 30 is introduced substantially completely or only together with the first exhaust gas partial flow $T_1$ into the core flow channel 18. Consequently, reactant is prevented from being introduced into the covering flow channel 22 and forming deposits at that location. In this case, consideration must be given to the fact that a significant function of the covering flow channel 22 is the thermal screening of the core flow channel 18 in the direction toward the environment and therefore particularly the external mixing path housing 16 may have a comparatively low temperature which could support the condensation of reactant and therefore the production of deposits.

It should be noted that, for example, the reactant discharge arrangement 28 could also be arranged in such a manner that the mixer 34 is positioned so as to engage in the core flow channel 18 and/or that no gap-like intermediate space is formed between the downstream end of the mixer 34 and the internal mixing path housing 14 so that the entire first exhaust gas partial flow $T_1$ is introduced through the mixer 34 into the core flow channel 18.

A flow blocking element 38 which is schematically illustrated in FIG. 1 is arranged in the covering flow channel 22.

The flow blocking element 38 is positioned in such a manner that it abuts an outer side 40 of the internal mixing path housing 14, or is retained, and that a throughflow region 44 is formed between the flow blocking element 38 and an inner side 42 of the external mixing path housing 16. In the throughflow region 44, the flow cross section of the covering flow channel 22 is reduced with respect to a flow cross section thereof upstream of the flow blocking element 38 and with respect to a flow cross section thereof downstream of the flow blocking element 38.

Figure 2:
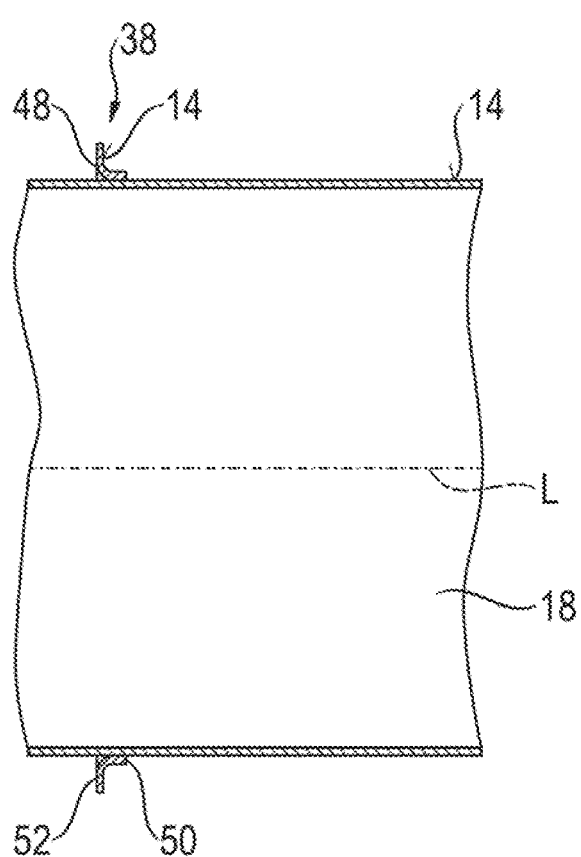
FIG. 2 shows a portion of an internal mixing path housing of the mixing path of FIG. 1 with a flow blocking ring which is arranged at an outer side thereof; and, FIG. 3 shows a perspective and partially transparent schematic of a portion of the mixing path of FIG. 1.

FIG. 2 clearly shows the flow blocking element 38 which is provided at the outer side 40 of the internal mixing path housing 14. The flow blocking element 38 is in the form of a flow blocking ring 46. The flow blocking ring 46 surrounds the mixing path longitudinal axis L or the internal mixing path housing 14 in a circumferential direction substantially completely or without interruption and has an annular member 48 with a substantially L-shaped cross section. A first L-shaped leg 50 of the annular member 48 extends substantially in the direction of the mixing path longitudinal axis L and abuts the outer side 40 of the internal mixing path housing 14. A second L-shaped leg 52 of the annular member 48 extends from the first L-shaped leg 50 radially outwardly and consequently delimits together with the external mixing path housing 16 the throughflow region 44 which can be seen in FIG. 1. As a result of the annular structure of the flow blocking element 38, the throughflow region 44 also has an annular structure which surrounds the mixing path longitudinal axis L.

By arranging the flow blocking element 38 in the covering flow channel 22 and the constriction, which is thereby generated, of the flow cross section in a local region, the flow resistance of the covering flow channel 22 is increased. This increase of the flow resistance is substantially dependent on the dimension of the radial extent of the second L-shaped leg 52 and the flow cross sectional surface-area which is also defined thereby in the throughflow region 44. By selecting the dimensions or the shaping of the flow blocking element 38, it is consequently possible to adjust the flow resistance in the covering flow channel 22 and consequently the portion, which flows through the covering flow channel 22, of the entire exhaust gas flow A, that is, the second exhaust gas flow $T_2$, and therefore also the relationship of the respective mass flows through the core flow channel 18 and the covering flow channel 22. Consequently, it is possible to have, simply by selecting the shaping or dimensions of the flow blocking element 38, a significant influence on the division of the exhaust gas partial flows $T_1$, $T_2$ and to adapt the mixing path 12 to different environments for use, that is, for example, the use in connection with differently configured or dimensioned internal combustion engines, without it being necessary to this end to carry out structural modifications to the components which delimit the flow channels, that is, for example, the internal mixing path housing 14 or the external mixing path housing 16. This allows the mixing path 12 to be provided for a large number of applications with a basic structure, particularly of the internal mixing path housing 14 and the external mixing path housing 16 and the adaptation to different environments for use to be produced by inserting differently configured flow blocking elements 38.

Figure 3:
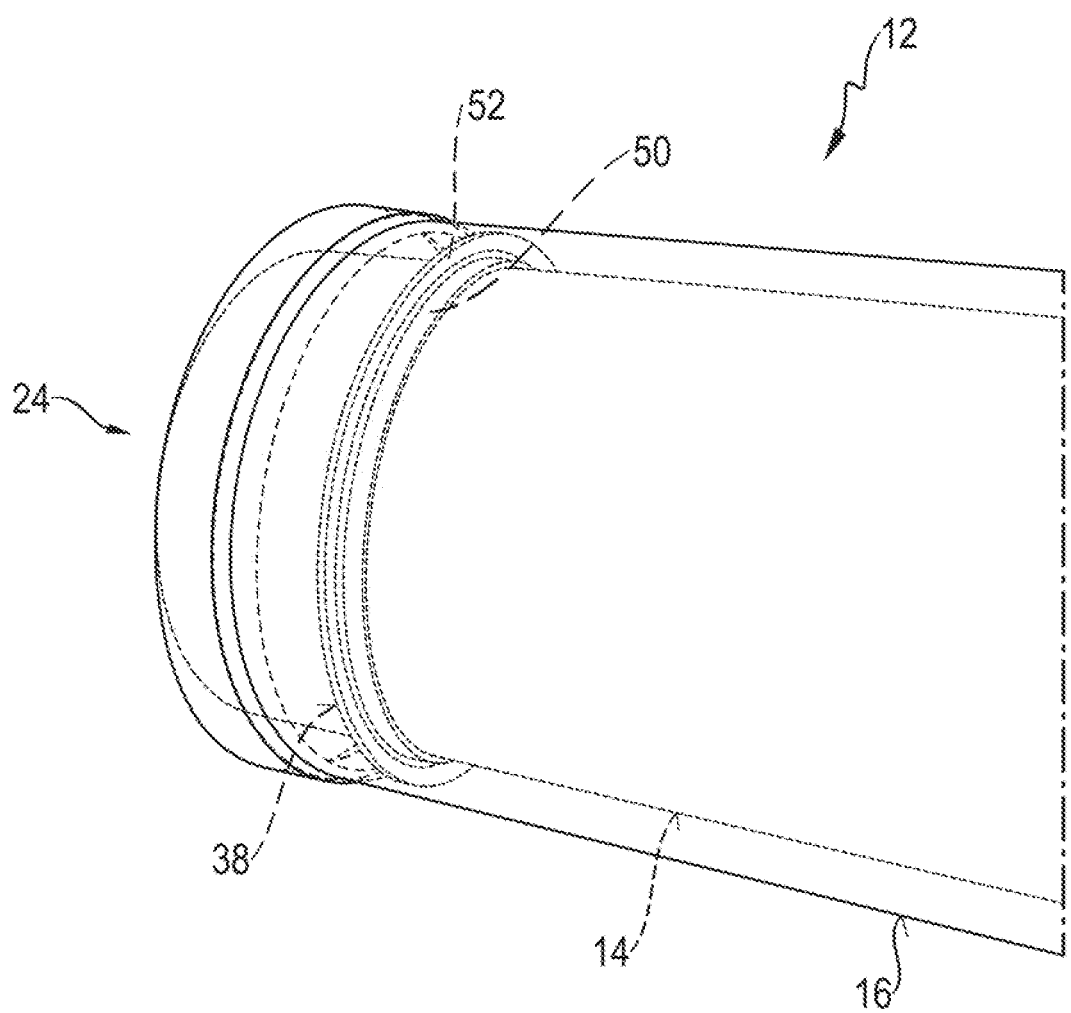

Although the positioning, which can also be seen in FIGS. 2 and 3, of the flow blocking element 38 is particularly advantageous at the outer side 40 of the internal mixing path housing 14 because then thermal losses introduced via the flow blocking element 38 in the direction toward the external mixing path housing 16 can be prevented, FIG. 1 shows using an alternative positioning of the flow blocking element 38' as illustrated with a broken line that this could in principle also be provided at the external mixing path housing 16 so that the throughflow region 44' is formed between the flow blocking element 38' and the outer side of the internal mixing path housing 14. In this case, the first L-shaped leg of the flow blocking element 38 which is provided as a flow blocking ring could be positioned in abutment against the inner side 42 of the external mixing path housing 16, for example, also as in the embodiment illustrated in FIG. 2 so that the first L-shaped leg extends from the second L-shaped leg in a downstream direction.

In principle, a plurality of flow blocking elements could be provided in the covering flow channel 22 successively in the flow direction, wherein, for example, alternately a flow blocking element 38 is arranged on the internal mixing path housing 14 and a flow blocking element 38' can be provided on the external mixing path housing 16 so that a meandering flow path, which is indicated in the upper portion of FIG. 2 by a flow arrow and which leads to a further increased flow resistance, is predetermined for the second exhaust gas partial flow $T_2$. To this end, the flow blocking elements 38, 38' which are arranged successively in the direction of the mixing path longitudinal axis L and alternately on the internal mixing path housing 14 and on the external mixing path housing 16 can be dimensioned in a radial direction, that is, in the region of the second L-shaped legs thereof, in such a manner that they overlap each other in a radial direction.

For a stable connection, the flow blocking element 38 can be securely connected to a mixing path housing 14 or 16, which carries it, in a materially engaging manner, for example, by welding. In this case, for example, the first L-shaped leg can be secured to the respective mixing path housing 14 or 16 in the downstream end region thereof and/or in the upstream end region thereof by a, for example, circumferential weld seam or by individual weld spots, respectively. Alternatively or additionally, a stable connection can also be produced by a non-positive-locking connection, that is, by frictional engagement, by the flow blocking element 38 being pressed with the annular member 48 thereof axially on or in the mixing path housing 14 or 16 which carries it, respectively.

Particularly FIGS. 1 and 3 show that the flow blocking element 38 is positioned near the upstream mixing path inflow region 24. This can be achieved, for example, in that the length portion, which is located between the upstream inflow region 24 and the flow blocking element 38, of the covering flow channel 22 is less than half, preferably less than 20%, of the entire length of the covering flow channel 22 in the direction of the mixing path longitudinal axis L. A flow blockage or a dead flow space in the covering flow channel 22 is thereby substantially prevented so that a uniform throughflow thereof and in particular also a thermal screening, which is reliably introduced by the second exhaust gas partial flow $T_2$, of the core flow channel 18 is ensured.

It should be noted that the flow blocking element 38, which is provided as a separate component in the covering flow channel 22 or generally a bypass flow channel 20 which is guided parallel with the core flow channel 18, could also be provided with a different geometric configuration. Thus, the two L-shaped legs 50, 52 do not necessarily have to have the substantially orthogonal orientation which can be seen in FIG. 2. The angle which is defined between them may, for example, also be greater than or less than 90°. Furthermore, the radial extent length of the second L-shaped leg 52 which substantially contributes to the constriction of the flow cross section may vary over the circumference about the mixing path longitudinal axis L in order consequently to produce a blocking effect which varies over the circumference. The flow blocking element 38 could also be interrupted in a circumferential direction or be provided by a plurality of members which are arranged successively in a circumferential direction, for example, arranged offset relative to each other in the direction of the mixing path longitudinal axis L.

It is understood that the foregoing description is that of the preferred embodiments of the invention and that various changes and modifications may be made thereto without departing from the spirit and scope of the invention as defined in the appended claims.

The invention claimed is:

1. A mixing subassembly for an exhaust gas system of an internal combustion engine for mixing exhaust gas discharged by the internal combustion engine with a reactant, the mixing subassembly comprising:
   said mixing subassembly defining a mixing path having a longitudinal axis along which said mixing path extends;
   said mixing path having an upstream mixing path inflow region for receiving at least one of said exhaust gas and said reactant into said mixing path;
   a core flow channel for passing a first exhaust gas partial flow therethrough;
   a bypass flow channel for passing a second exhaust gas partial flow therethrough, said bypass flow channel including a covering flow channel annularly surrounding said core flow channel;
   said mixing path including an external mixing path housing delimiting said covering flow channel in a radially outward manner and having an inner side facing toward said covering flow channel;
   said mixing path including an internal mixing path housing delimiting said core flow channel in a radially outward manner to separate said core flow channel from said covering flow channel and having an outer side facing toward said covering flow channel;
   at least two flow blocking elements, each flow blocking element of said at least two flow blocking elements including a flow blocking ring arranged in said covering flow channel to reduce a flow cross section of said covering flow channel;
   at least one first flow blocking element of said at least two flow blocking elements being secured to said inner side of said external mixing path housing so as to form a first throughflow region between said least one first flow blocking element and said outer side of said internal mixing path housing, said first throughflow region having a flow cross section reduced with respect to a flow cross section of said covering flow channel upstream of said at least one first flow blocking element and with respect to a flow cross section of said covering flow channel downstream of said at least one first flow blocking element;
   at least one second flow blocking element of said at least two flow blocking elements being secured to said outer side of said internal mixing path housing so as to form a second throughflow region between said at least one second blocking element and said inner side of said external mixing path housing, said second throughflow region having a flow cross section reduced with respect to said flow cross section of said covering flow channel upstream of said at least one second flow blocking element and with respect to said flow cross section of said covering flow channel downstream of said at least one second flow blocking element; and,
   said first and second flow blocking elements being secured alternately to said external mixing path housing and said internal mixing path housing in a successive manner in the direction of said longitudinal axis of said mixing path.

2. The mixing subassembly of claim 1, wherein each flow blocking ring of the at least two flow blocking elements completely surrounds said longitudinal axis of said mixing path.

3. The mixing subassembly of claim 1, wherein each flow blocking element of said at least two flow blocking elements comprises an annular body member having an L-shaped cross section having first and second legs; and, wherein:
   said first leg is secured to said inner side of said external mixing path housing and said second leg extends away from said first leg and protrudes radially into said covering flow channel and delimits said throughflow region with said internal mixing path housing; or,
   said first leg is secured to said outer side of said internal mixing path housing and said second leg extends away from said first leg and protrudes radially into said covering flow channel and delimits said throughflow region with said external mixing path housing.

4. The mixing subassembly of claim 3, wherein said annular body member of each flow blocking element is secured with said first leg to one of the following: said external mixing path housing or to said internal mixing path housing by a non-positive-locking connection and/or a materially engaging connection.

5. The mixing subassembly of claim 4, wherein said materially engaging connection is a welded connection.

6. The mixing subassembly of claim 1, wherein said first and second flow blocking elements mutually overlap radially.

7. The mixing subassembly of claim 1, wherein said at least two flow blocking elements are arranged in a region of said upstream mixing path inflow region.

8. The mixing subassembly of claim 1, further comprising a reactant discharge arrangement for discharging said reactant into said mixing path.

9. The mixing subassembly of claim 8, wherein said reactant discharge arrangement comprises a mixer.

10. The mixing subassembly of claim 9, wherein said mixer is configured to expand radially in a direction of a reactant main discharge.

11. The mixing subassembly of claim 8, wherein said reactant discharge arrangement is configured to discharge said reactant only into said first exhaust gas partial flow.

12. An exhaust gas system comprising:
   a mixing subassembly for mixing exhaust gas discharged by an internal combustion engine with a reactant;
   the mixing subassembly comprising:
   said mixing subassembly defining a mixing path having a longitudinal axis along which said mixing path extends;
   said mixing path having an upstream mixing path inflow region for receiving at least one of said exhaust gas and said reactant into said mixing path;
   a core flow channel for passing a first exhaust gas partial flow therethrough;
   a bypass flow channel for passing a second exhaust gas partial flow therethrough, said bypass flow channel including a covering flow channel annularly surrounding said core flow channel;

said mixing path including an external mixing path housing delimiting said covering flow channel in a radially outward manner and having an inner side facing toward said covering flow channel;

said mixing path including an internal mixing path housing delimiting said core flow channel in a radially outward manner to separate said core flow channel from said covering flow channel and having an outer side facing toward said covering flow channel;

at least two flow blocking elements, each flow blocking element of said at least two flow blocking elements including a flow blocking ring arranged in said covering flow channel to reduce flow cross section of said covering flow channel;

at least one first flow blocking element of said at least two flow blocking elements being secured to said inner side of said external mixing path housing so as to form a first throughflow region between said least one first flow blocking element and said outer side of said internal mixing path housing, said first throughflow region having a flow cross section reduced with respect to a flow cross section of said covering flow channel upstream of said at least one first flow blocking element and with respect to a flow cross section of said covering flow channel downstream of said at least one first flow blocking element;

at least one second flow blocking element of said at least two flow blocking elements being secured to said outer side of said internal mixing path housing so as to form a second throughflow region between said at least one second blocking element and said inner side of said external mixing path housing, said second throughflow region having a flow cross section reduced with respect to said flow cross section of said covering flow channel upstream of said at least one second flow blocking element and with respect to said flow cross section of said covering flow channel downstream of said at least one second flow blocking element; and, said first and second flow blocking elements being secured alternately to said external mixing path housing and said internal mixing path housing in a successive manner in the direction of said longitudinal axis of said mixing path.

* * * * *

UNITED STATES PATENT AND TRADEMARK OFFICE
CERTIFICATE OF CORRECTION

PATENT NO. : 11,898,484 B2
APPLICATION NO. : 18/164237
DATED : February 13, 2024
INVENTOR(S) : P. Weinmann et al.

Page 1 of 1

It is certified that error appears in the above-identified patent and that said Letters Patent is hereby corrected as shown below:

In the Claims

In Column 7:
Line 49: Claim 1, insert -- at -- before "least".

In Column 9:
Line 18: Claim 12, insert -- at -- before "least".

Signed and Sealed this
Fourth Day of June, 2024

Katherine Kelly Vidal
*Director of the United States Patent and Trademark Office*